United States Patent
Yang et al.

(10) Patent No.: US 9,663,726 B2
(45) Date of Patent: May 30, 2017

(54) FLUID COMPOSITIONS AND METHODS FOR USING CROSS-LINKED PHENOLIC RESINS

(71) Applicant: BAKER HUGHES INCORPORATED, Houston, TX (US)

(72) Inventors: Jianzhong Yang, Missouri City, TX (US); Jack B. Ward, Tulsa, OK (US); Trevor Cappel, Sugarland, TX (US)

(73) Assignee: Baker Hughes Incorporated, Houston, TX (US)

( * ) Notice: Subject to any disclaimer, the term of this patent is extended or adjusted under 35 U.S.C. 154(b) by 501 days.

(21) Appl. No.: 14/176,718

(22) Filed: Feb. 10, 2014

(65) Prior Publication Data
US 2015/0225654 A1 Aug. 13, 2015

(51) Int. Cl.
*C10G 33/04* (2006.01)
*B01D 17/04* (2006.01)
*C10G 21/00* (2006.01)
*C10G 21/16* (2006.01)
*B01D 17/06* (2006.01)

(52) U.S. Cl.
CPC ........... *C10G 33/04* (2013.01); *B01D 17/047* (2013.01); *C10G 21/003* (2013.01); *C10G 21/16* (2013.01); *B01D 17/04* (2013.01); *B01D 17/06* (2013.01); *C08F 2810/20* (2013.01)

(58) Field of Classification Search
CPC ...... C10G 33/04; C10G 21/16; C10G 21/003; B01D 17/04; B01D 17/047; B01D 17/06; C08G 8/36; C08F 261/02; C08F 283/06; C08F 2810/20
USPC ............... 516/143, 145, 161, 168, 182, 183; 210/708; 208/188; 525/402, 523, 529, 525/530
See application file for complete search history.

(56) References Cited

U.S. PATENT DOCUMENTS

| | | | | |
|---|---|---|---|---|
| 2,501,015 A * | 3/1950 | Wirtel | ..................... | C10G 33/04 516/147 |
| 2,524,892 A * | 10/1950 | Keiser | ..................... | C10G 33/04 516/183 |
| 2,542,013 A * | 2/1951 | Keiser | ..................... | C10G 33/04 516/184 |
| 2,626,929 A * | 1/1953 | De Groote | ............. | C10G 33/04 516/187 |
| 2,723,241 A * | 11/1955 | Shen | ...................... | C10G 33/04 516/168 |
| 2,854,416 A * | 9/1958 | De Groote | ............. | C10G 33/04 516/168 |
| 2,997,460 A * | 8/1961 | De Groote | ............. | C08G 14/06 525/495 |
| 2,997,461 A * | 8/1961 | De Groote | ............... | C08G 8/28 525/496 |
| 4,098,717 A * | 7/1978 | Buriks | ................... | C10G 33/04 516/164 |
| 4,626,379 A * | 12/1986 | Buriks | ................. | B01D 17/047 516/168 |
| 4,814,394 A * | 3/1989 | Barthold | .................. | C08G 8/36 516/183 |
| 4,877,842 A * | 10/1989 | Buriks | ................... | C10G 33/04 516/178 |
| 5,759,409 A * | 6/1998 | Knauf | .................... | C10G 33/04 516/163 |
| 6,225,357 B1 | 5/2001 | Breen et al. | | |
| 7,671,098 B2 * | 3/2010 | Leinweber | ............. | C10G 33/04 516/173 |
| 7,981,979 B2 | 7/2011 | Flatt | | |
| 2006/0281931 A1 * | 12/2006 | Leinweber | ............. | C10G 33/04 549/347 |
| 2007/0100002 A1 * | 5/2007 | Leinweber | ........... | B01D 17/047 516/179 |
| 2007/0112079 A1 * | 5/2007 | McDaniel | .............. | C10G 33/04 516/191 |
| 2008/0296202 A1 * | 12/2008 | Sneddon | ................. | C08L 61/06 208/15 |
| 2009/0197978 A1 * | 8/2009 | Patel | ....................... | B01D 3/00 516/180 |
| 2012/0053101 A1 * | 3/2012 | Yang | .................... | C10L 1/1905 508/555 |
| 2012/0059088 A1 | 3/2012 | Hilfiger et al. | | |
| 2012/0117861 A1 * | 5/2012 | Yang | .................... | C10L 1/1905 44/398 |
| 2013/0237641 A1 * | 9/2013 | Riff | ...................... | B01D 17/047 523/414 |

OTHER PUBLICATIONS

Pivnenko et al, "Bisphenol A and its structural analogues in household waste paper," Waste Management 44 (2015) 39-47.*
Sullivan, Andrew P., et al., "The Effects of Inorganic Solid Particles on Water and Crude Oil Emulsion Stability", Ind. Eng. Chem. Res. 2002, 41, 3389-3404.
Pereira, Juan Carlos, et al., "Breaking of Water-in-Crude Oil Emulsions. 4. Estimation of the Demulsifier Surfactant Performance to Destabilize the Asphaltenes Effect", Energy Fuels, 2011, 25(3), pp. 1045-1050.

* cited by examiner

Primary Examiner — Daniel S Metzmaier
(74) Attorney, Agent, or Firm — Mossman, Kumar & Tyler, P.C.

(57) ABSTRACT

A cross-linked phenolic resin demulsifier may be added to a water-in-oil emulsion having at least one foulant therein. The demulsifier may separate at least a portion of the foulant(s) from the water-in-oil emulsion, and the separated foulant(s) may be removed from the water-in-oil emulsion. In a non-limiting embodiment, the amount of the demulsifier present in the water-in-oil emulsion may range from about 0.1 ppm to about 50,000 ppm.

18 Claims, No Drawings

FLUID COMPOSITIONS AND METHODS FOR USING CROSS-LINKED PHENOLIC RESINS

TECHNICAL FIELD

The present invention relates to methods and fluid compositions for separating foulants and/or water from a water-in-oil emulsion by adding a demulsifier thereto, and more specifically relates to adding a demulsifier having two phenolic resin chains cross-linked by a carbon or heteroatom.

BACKGROUND

The breaking of water-in-crude emulsions is still a challenge in the petroleum industry. A water-in-oil emulsion results from the mixing of a water-based fluid and crude oil, which are two immiscible fluids. Water or brine typically accompany crude oil during its recovery from a reservoir, and additional water may also be added to aid in secondary oil recovery as the well nears the end of production. At the refinery, additional water may be emulsified into the crude oil in an effort to extract salts and fine solids from the crude oil. The water-based fluid may form droplets within the crude oil, i.e. the water-based fluid droplets are the discontinuous phase, and the oil-based fluid (e.g. crude oil) is the continuous phase.

The presence of the emulsion is beneficial for the extraction process, but it poses major problems for the additional refining steps. The emulsified water may corrode refinery equipment, such as overhead distillation columns, and poison catalysts as a result of dissolved salts. The viscous emulsions can foul machinery, and entrained solids can accumulate in certain unit operations. Crude oil may be lost when trying to dispose or rid the water from the water-in-crude emulsion.

At the oil-water interface of the water-in-oil emulsion, foulants may accumulate and produce a stagnant film that may resist droplet coalescence. The foulants may be or include, but are not limited to, asphaltenes, coke, coke precursors, inorganic solids, and the like. Asphaltenes are most commonly defined as that portion of petroleum, which is soluble in xylene and toluene, but insoluble in heptane or pentane. Asphaltenes exist in crude oil as both soluble species and in the form of colloidal dispersions stabilized by other components in the crude oil. Asphaltenes have higher molecular weights and are the more polar fractions of crude oil, and may precipitate upon pressure, temperature, and compositional changes in crude oil resulting from blending or other mechanical or physicochemical processing.

Asphaltene precipitation and deposition may cause problems in subterranean reservoirs, upstream production facilities, mid-stream transportation facilities, refineries, and fuel blending operations. In petroleum production facilities, asphaltene precipitation and deposition can occur in near wellbore reservoir regions, wells, flowlines, separators, and other equipment. Once deposited, asphaltenes present numerous problems for crude oil producers. For example, asphaltene deposits may plug downhole tubulars, wellbores, choke off pipes and interfere with the functioning of safety shut-off valves, and separator equipment. Asphaltenes have caused problems in refinery processes, such as desalters, distillation preheat units, and cokers.

In addition to carbon and hydrogen in the composition, asphaltenes may contain nitrogen, oxygen and sulfur species, and may also contain metal species such as nickel, vanadium, and iron. Typical asphaltenes are known to have different solubilities in the formation fluid itself or in certain solvents like carbon disulfide or aromatic solvents, such as benzene, toluene, xylene, and the like. However, the asphaltenes are insoluble in solvents like paraffinic compounds, including but not limited to pentane, heptane, octane, etc. Asphaltene stability may even be disturbed by mixing hydrocarbon-based fluids i.e. such as mixing two types of crude oils together, two types of shale oils together, condensates, and others, of different origins at certain ratios as the chemistry of the hydrocarbon-based fluids from different sources may be incompatible and induce destabilization of the asphaltenes therein. In non-limiting examples, such as during refining or fuel blending, two or more hydrocarbon-based fluids may be mixed together. Sometimes, changes in physical conditions are sufficient to induce destabilization, or even the mixture of different hydrocarbon-based fluids that have incompatible chemistries. Said differently, even if neither hydrocarbon-based fluid, alone, has destabilized foulants or the hydrocarbon-based fluid would not act as a destabilizing additive by itself, the mixing or the mixture of two or more hydrocarbon-based fluids may destabilize the foulants present in either hydrocarbon-based fluid.

Coke is an insoluble organic portion of crude oil, distillation residua, or residua from thermal/catalytic conversion processes, such as including but not limited to visbreaker tar or LC finer/H oil residuum. Coke may have polyaromatic hydrocarbons (PAHs) dispersed therein with a ring structure of about 4 to about 5 or more condensed aromatic rings.

Coke precursors are the fragments that make up the coke. They are often formed by thermal cracking, dealkylation and/or dehydrogenation processes commonly used for the breaking down of complex organic molecules. They are barely soluble in the crude oil and/or residual, and tend to precipitate. Once they precipitate, the coke precursors tend to polymerize or conglomerate and form coke.

Inorganic solids may also add emulsion stability if the particle sizes are small enough, e.g. a few microns or less, to become active at the oil-water interface with the resins and asphaltenes from the crude oil. The presence of inorganic solids may add bulk and increase the stability of the asphaltene-resin film at the water-oil interface. There is an inverse relationship between the emulsion stability and inorganic solid particles; a decrease in particle size of the inorganic solids may increase the emulsion stability.

There are large costs associated with shutting down production units because of the fouling components within, as well as the cost to clean the units. The foulants may create an insulating effect within the production unit, reduce the efficiency and/or reactivity, and the like. In either case, reducing the amount of fouling would reduce the cost to produce hydrocarbon fluids and the products derived therefrom. Accordingly, there are large incentives to mitigate fouling during refining.

It would be desirable if better demulsifiers and methods for using the same were developed for separating at least a portion of foulants from the water-in-crude emulsions.

SUMMARY

There is provided, in one form, a method for separating at least a portion of foulants from a water-in-oil emulsion. The method may include adding an effective amount of a demulsifier to a water-in-oil emulsion having at least one foulant therein to separate at least a portion of the foulant(s) from the water-in-oil emulsion and separating at least a portion of the foulants from the water-in-oil emulsion. The demulsifier may have or include two phenolic resin chains cross-linked by a carbon or heteroatom, such as but not limited to an oxygen, a nitrogen, a sulfur, a phosphorus, and combinations thereof.

There is further provided in an alternative non-limiting embodiment of method where the demulsifier may be represented by the following structure:

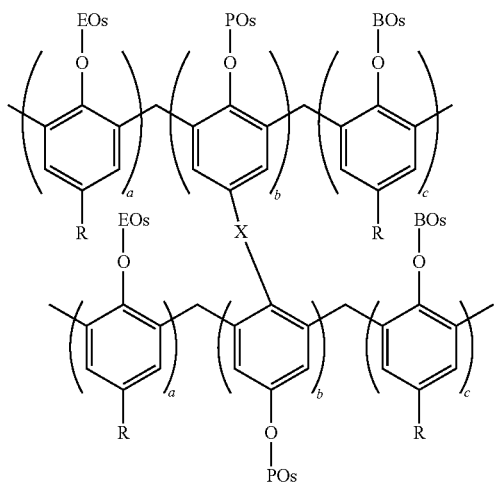

where:
EOs is a polyethylene oxide moiety;
POs is a polypropylene oxide moiety;
BOs is a polybutylene oxide moiety;
X is a carbon or heteroatom selected from the group consisting of oxygen, nitrogen, sulfur, phosphorus, and combinations thereof; R is a $C_4$-$C_{30}$ alkyl chain;
$a+b+c>1$; and
$EOs+POs+BOs>1$.

In an alternative embodiment, a fluid composition is described, which may have or include, but is not limited to a water-in-oil emulsion having at least one foulant, and a demulsifier comprising two phenolic resin chains cross-linked by a carbon or heteroatom selected from the group consisting of a nitrogen, a sulfur, a phosphorus, and combinations thereof. An effective amount of the demulsifier may separate more of the foulant(s) from the water-in-oil emulsion as compared to an otherwise identical water-in-oil emulsion absent the demulsifier.

In a non-limiting embodiment of the fluid composition, the demulsifier may be present in the fluid composition in an amount ranging from about 0.1 ppm to about 50,000 ppm. The demulsifier may be represented by the following structure:

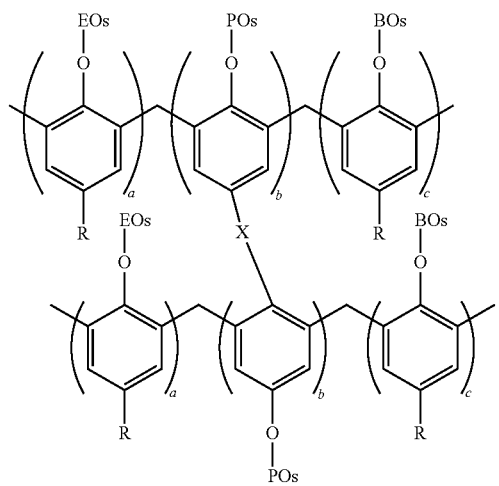

where:
EOs is a polyethylene oxide moiety;
POs is a polypropylene oxide moiety;
BOs is a polybutylene oxide moiety;
X is a carbon or heteroatom selected from the group consisting of oxygen, nitrogen, sulfur, phosphorus, and combinations thereof;
R is a C4-C30 alkyl chain;
$a+b+c>1$; and
$EOs+POs+BOs>1$; and
The demulsifier appears to aid the separation of water and/or foulants from a water-in-oil emulsion.

DETAILED DESCRIPTION

It has been discovered that a demulsifier, having two phenolic resin chains cross-linked by a carbon or a heteroatom, may be added to a water-in-oil emulsion (e.g. water-in-crude) in an effective amount for separating at least a portion of foulants from the water-in-oil emulsion. The heteroatom may be an oxygen, a nitrogen, a sulfur, a phosphorus, and combinations thereof. In a non-limiting embodiment, the demulsifier may separate at least a portion of foulants and water from the water-in-oil emulsion.

Typically, demulsifiers may be used to separate or break emulsions, such as separating water from oil in a water-in-oil emulsion. The type of demulsifier used for a particular emulsion may depend on the type of emulsion. Although the inventors do not wish to be bound to any particular theory, it is thought that the demulsifier may migrate by convection and/or diffusion to the water-oil interface of the water-in-oil emulsion to combine with the foulants present at the interface. The demulsifier may separate the water and/or foulants from the water-in-oil emulsion. It is thought that the non-linear steric structure of the demulsifier may be more efficient in destabilizing at least a portion of the film at the interface and prevent the foulants from clustering within the water-in-oil emulsion than a traditional phenolic resin demulsifier (e.g. an oxyalkylated linear phenolic resin). Once a portion of the foulants is separated from the emulsion, the separated foulants may be removed from the fluid.

Complete separation and/or removal of the foulants and/or water from the water-in-oil emulsion is desirable, but it should be appreciated that complete separation and/or removal is not necessary for the methods and fluid compositions discussed herein to be considered effective. Success is obtained if more foulants and/or water are separated from the water-in-oil emulsion by adding the demulsifier to the water-in-oil emulsion than in the absence of the demulsifier. Alternatively, the methods and fluid compositions described are considered successful if a majority of the foulants and/or water is separated from the water-in-oil emulsion.

In a non-limiting example, the demulsifier may be represented by the following structure:

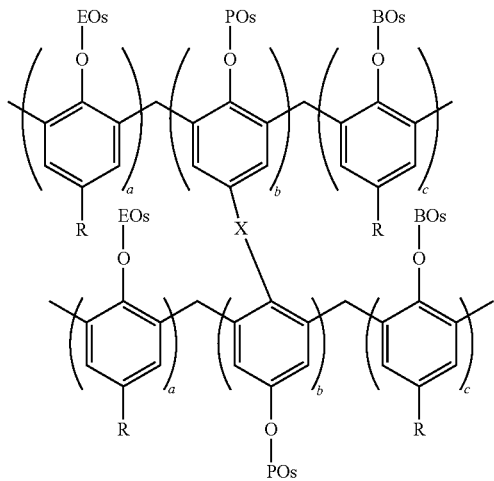

wherein:
EOs is a polyethylene oxide moiety;
POs is a polypropylene oxide moiety;
BOs is a polybutylene oxide moiety;
X is a carbon or a heteroatom (e.g. oxygen, nitrogen, sulfur, phosphorus, and combinations thereof);
R is a $C_4$-$C_{30}$ alkyl chain;
a+b+c>1; and
EOs+POs+BOs>1.

The joining atom or bridge, X, is depicted in the structure as being between two phenol rings where each phenol has a polypropylene oxide moiety. However, in non-limiting embodiments, X may be between any two phenols as long as one phenol is on each polymer chain. For example, a phenol having an EO moiety may be on a polymer chain on one side of X, and a phenol moiety having a BO moiety may be on a polymer chain on the other side of X; a phenol having a BO moiety may be on a polymer chain on one side of X, and a phenol moiety having a PO moiety may be on a polymer chain on the other side of X; and the like.

The structure also depicts the 'EOs', 'POs', and 'BOs' as block segments (i.e. only one monomer type), but these may be mixed amongst each other to create a mixed copolymer in a non-limiting embodiment. Moreover, even though, the structure depicts the moieties in the order 'EO-PO-BO', but these moieties may be in any order.

The definition for the structure, 'a+b+c>1' is further defined to mean that at least one oxide moiety is attached to the demulsifier, such as at least one EO, PO, or BO on at least one polymer chain. In a non-limiting embodiment, an EO and a PO may be present; an EO and a BO may be present; an EO and a BO may be present; an EO, PO, and BO may be present. The top chain may have the oxide moieties, or the bottom chain may have the oxide moieties, or the top polymer chain and the bottom polymer chain may have the oxide moieties. 'Polymer chain' as used herein is defined as being the polymer chain to which the EO, PO, and/or BO are attached; said differently, there are two polymer chains depicted in the structure where one polymer chain is present on each side of the 'X' bridge.

In a non-limiting embodiment, 'a' may range from about 0 independently to about 1000; alternatively, from about 1 independently to about 500. 'b' may range from about 0 to about 1000, or from about 1 independently to about 500. 'c' may range from about 0 to about 1000, or from about 1 independently to about 500. As used herein with respect to a range, "independently" means that any lower threshold may be used together with any upper threshold to give a suitable alternative range.

In a non-limiting embodiment, the water-in-oil emulsion may be a water-in-crude emulsion. The crude-based phase of the emulsion may be a heavy crude, such as but not limited to Canadian crude, Venezuelan crude, Murray crude, and combinations thereof. The water-based phase of the water-in-oil emulsion may be a water-based fluid or brine-based fluid. The foulants may be present at the interface of the emulsion, in the non-aqueous phase, and combinations thereof. In a non-limiting embodiment, the demulsifier may be added to the water-based and/or the oil-based phase of the water-in-oil emulsion. Alternatively, the demulsifier may be in a solution with an organic solvent, and the solution may be added to the oil-based phase (e.g. crude).

The effective amount of the demulsifier may range from about 0.1 ppm independently to about 50,000 ppm, alternatively from about 1 ppm independently to about 3000 ppm, or from about 5 ppm independently to about 1000 ppm.

A solvent and/or a second component may be added to the water-in-oil emulsion at the same time or a different time from the demulsifier. The solvent may be or include, but is not limited to a hydrocarbon-based solvent, an alcohol-based solvent, an organic carbonate-based solvent, a glycol, a polyglycol, a ketone, an ester, an acetate, and mixtures thereof. The second component may be or include, but is not limited to a polyol, a diepoxide, and combinations thereof.

In an alternative non-limiting embodiment, the demulsifier may be part of an additive having at least the demulsifier, the solvent, and the second component. Non-limiting embodiments of the additive may include at least the demulsifier, the solvent, and the polyol; the combination of the demulsifier, the solvent, and the diepoxide; and the combination of the demulsifier, the solvent, the polyol, and the diepoxide. Non-limiting examples of the polyol may be or include polyethylene glycol, polypropylene glycol, poly(tetramethylene ether)glycol, polyesters, and combinations thereof.

The additive may include the demulsifier in an amount ranging from about 10 wt % independently to about 90 wt %, alternatively from about 30 wt % independently to about 70 wt %. The additive may include the solvent in an amount ranging from about 10 wt % to about 90 wt %, alternatively from about 30 wt % independently to about 60 wt %. The additive may include the polyol in an amount ranging from about 1 wt % independently to about 60 wt %, alternatively from about 5 wt % independently to about 20 wt %. The additive may include the diepoxide in an amount ranging from about 10 wt % independently to about 60 wt %, alternatively from about 30 wt % independently to about 50 wt %.

Non-limiting examples of heavy crude may be or include, but are not limited to Canadian crude, Venezuela crude, Murray crude, and combinations thereof. The foulants present in the water-in-oil emulsion may be or include, but are not limited to, an asphaltene, an inorganic solid, coke precursors, and combinations thereof. Non-limiting examples of the inorganic solids may be or include formation fines, sand, clays, metal chlorides, metal oxides, and combinations thereof.

In a non-limiting embodiment, a treated fluid composition is described. The treated fluid composition may include a water-in-oil emulsion (e.g. water-in-crude emulsion) having at least one foulant, and a demulsifier that separates more of the foulants from the water-in-oil emulsion as compared to an otherwise identical water-in-oil emulsion absent the demulsifier. The demulsifier in the treated fluid composition may be represented by the structure described above.

The invention will be further described with respect to the following Examples, which are not meant to limit the invention, but rather to further illustrate the various embodiments.

EXAMPLES

The following Electrostatic Desalting Dehydration Apparatus (EDDA) Test Method was employed for Examples 1-5 to screen possible blend compositions. The EDDA is a laboratory test device that simulates the desalting process.

1. A set amount of crude oil was added to a Waring blender to be tested minus the percent of wash water (depending on the number of tubes the EDDA will hold),
2. 5.6% of deionized (DI) wash water was added to the blender to bring the total volume up to the necessary total volume (typically 800, 600 or 400 mL).
3. The mixture was mixed at 40% speed (on a Variac mixer) for 30 seconds,
4. The mixture was poured into the EDDA tubes to just below the 100 mL line.
5. The tubes were placed in the EDDA heating block that is heated to the desired test temperature (120° C.).
6. The demulsifier, in ppm, was added to each tube, except for the samples noted as 'blank' samples, which did not include demulsifier. A blank was run with each set for comparison purposes.
7. The screw top electrode was placed in the EDDA tubes and the samples were heated for approximately 25 minutes.
8. The caps were tightened, and each tube was shaken for 100-200 times and placed back in the heating block to be reheated for five minutes,
9. The electrode cover was placed over the EDDA tubes and locked into place with good contact between the cover and the electrode caps.
10. The electrodes ran at 1500 volts for five minutes.
11. The tubes were pulled out, and the percent water drop was recorded; the data is noted below in the 'settling data' for each set of samples. The quality of the interface and the quality of the water was also recorded,
12. Steps 9, 10, and 11 were repeated until the desired total residence time was achieved.
13. A dehydration test was performed on each set of samples, and the results are noted in the BS&W data below for each set of samples. The following procedure was used:
    a) A 12.5 mL centrifuge tube was filled to the 50% mark with xylene.
    b) 5.8 mL of dehydrated crude was mixed in the centrifuge tube with the xylene.
    c) The mixture in the centrifuge tube was centrifuged for 2000 rpm for 4 minutes.
    d) The percentage of water, emulsion, and solids were recorded, which notes the amount of water and/or solids that came out of each sample.

To judge the water and interface, 'p', 'f', and 'g' designations refer to the water's clarity, while 'VB', 'B', 'SB', and 'G' refer to the interface. 'p' refers to 'poor', which means the water is dirty and little if any light may be seen through the water. 'f' refers to 'fair', which means the water is translucent or is relatively clear, but there is oil hanging on the sides of the tube in the water layer. Combined ratings, such as 'pf', indicates an intermediate rating. 'g' refers to good, which means the water is clear and bright. 'VB' refers to 'very baggy', which means the interface is solid and unmoving. 'B' refers to baggy', which means the interface moves but remains thick. 'SB' refers to 'slightly baggy', which means the swirling may cause the interface to eddy (e.g. a whirlpool or vortex motion) and shrink. 'G' refers to good, which means the interface may be sharp and have no discernible pad.

Example 1

The first set of samples had 8 samples, and Sample 1 was the blank sample having no demulsifier. Sample 2 included 35 ppm of a polymeric elastomer demulsifier; Sample 3 included 35 ppm of an oxyalkylated alkylphenol resin crosslinked by sulfur bridge diphenol demulsifier in combination with a base-catalyzed oxyalkylated alkylphenol resin to form the demulsifier; Sample 4 included 35 ppm of an oxyalkylated alkylphenol resin crosslinked by sulfur bridge diphenol demulsifier in combination with a base-catalyzed oxyalkylated alkylphenol resin to form the demulsifier; Sample 5 included 35 ppm of an oxyalkylated alkylphenol resin crosslinked by a carbon bridge diphenol demulsifier. The amount of foulants settled and the water/IF was recorded at 5 minutes, 10 minutes, 15 minutes, and 20 minutes.

As noted in TABLE 1, at 5 minutes, 4 ppm of foulants separated from the water-in-crude emulsion for each of samples 2-5 having a demulsifier. At 20 minutes, the demulsifiers within samples 2 and 3 separated the most amount of foulants (5.6 ppm) from the sample as compared to 3 ppm of foulants separated for the blank.

TABLE 1

Settling Data

| No. | PPM | 5 Min. | Wa-ter/IF | 10 Min. | Wa-ter/IF | 15 Min. | Wa-ter/IF | 20 Min. | Wa-ter/IF |
|---|---|---|---|---|---|---|---|---|---|
| 1 | 0 | TR | p | 1 | P/VB | 3 | p/VB | 3 | p |
| 2 | 35 | 4 | p | 5 | F/SB | 5.6 | fg | 5.6 | fg |
| 3 | 35 | 4 | pf | 5 | F/SB | 5.6 | fg | 5.6 | fg |
| 4 | 35 | 4 | f | 4.9 | FG/sb | 5 | fg | 5.3 | fg |
| 5 | 35 | 4 | f | 5 | FG/sb | 5 | fg | 5.5 | fg |

Example 2

The second set of samples had 8 samples, and Sample 21 was the blank sample having no demulsifier. Sample 22 included 25 ppm of an acid catalyzed nonyl oxyalkylate resin demulsifier; Sample 23 included 25 ppm of an oxyalkylated alkyl phenol resin demulsifier; Sample 24 included 25 ppm of an oxyalkylated alkyl phenol resin demulsifier; Sample 25 included 25 ppm of an oxyalkylated alkyl phenol resin demulsifier; Sample 26 included 25 ppm of an oxyalkylated alkyl phenol resin demulsifier; Sample 27 included 25 ppm of an oxyalkylated alkyl phenol resin demulsifier; Sample 28 included 25 ppm of an oxyalkylated alkyl phenol resin demulsifier. The amount of foulants settled and the water/IF was recorded at 5 minutes, 10 minutes, 15 minutes, and 20 minutes.

As noted in TABLE 2, at 5 minutes, the demulsifier within sample 26 separated the most foulants from the sample at 4 ppm. At 20 minutes, the demulsifiers within samples 25-27 separated 5.7 ppm foulants from the Samples.

TABLE 2

SETTLING DATA

| No. | PPM | 5 Min. | Water/IF | 10 Min. | Water/IF | 15 Min. | Water/IF | 20 Min. | Water/IF |
|---|---|---|---|---|---|---|---|---|---|
| 21 | 0 | 0 | p | 0.5 | P | 0.5 | p | 1 | p |
| 22 | 25 | 3.5 | fg | 5 | G | 5.2 | g | 5.5 | g |
| 23 | 25 | 0.5 | pf | 0.5 | G | 0.5 | g | 1.2 | g |
| 24 | 25 | 2 | fg | 3 | G | 3.5 | g | 3.6 | g |
| 25 | 25 | 3.7 | fg | 5 | FG | 5.5 | fg | 5.7 | g |
| 26 | 25 | 4 | fg | 5 | FG | 5.2 | fg | 5.7 | g |
| 27 | 25 | 2.9 | fg | 4.9 | FG | 5.7 | g | 5.7 | g |
| 28 | 25 | 0.7 | fg | 4.6 | G | 5.2 | g | 5.7 | g |

Example 3

The third set of samples had 8 samples. Sample 31 included 22 ppm of demulsifier having an oxyalkylated alkylphenol resin crosslinked by a sulfur bridge diphenol; Sample 32 included 22 ppm of demulsifier having an oxyalkylated alkylphenol resin crosslinked by a sulfur bridge diphenol; Sample 33 included 22 ppm of demulsifier having an oxyalkylated alkylphenol resin crosslinked by a sulfur bridge diphenol; Sample 34 included 22 ppm of demulsifier having an oxyalkylated alkylphenol resin crosslinked by a sulfur bridge diphenol; Sample 35 included 22 ppm of demulsifier having an oxyalkylated alkylphenol resin crosslinked by a sulfur bridge diphenol; Sample 36 included 22 ppm of demulsifier having an oxyalkylated alkylphenol resin crosslinked by a sulfur bridge diphenol; Sample 37 included 22 ppm of demulsifier having an oxyalkylated alkylphenol resin crosslinked by a sulfur bridge diphenol; Sample 38 included 22 ppm of demulsifier having an oxyalkylated alkylphenol resin crosslinked by a sulfur bridge diphenol. The amount of foulants settled and the water/IF was recorded at 5 minutes, 10 minutes, 15 minutes, and 20 minutes.

As noted in TABLE 3, at 5 minutes, the demulsifiers within samples 36-37 separated the most foulants from the sample at 5 ppm. At 20 minutes, the demulsifiers within 35-38 separated the most foulants from the sample at 5.6 ppm.

TABLE 3

SETTLING DATA

| No. | PPM | 5 Min. | Water/IF | 10 Min. | Water/IF | 15 Min. | Water/IF | 20 Min. | Water/IF |
|---|---|---|---|---|---|---|---|---|---|
| 31 | 22 | TR | fg | 0.25 | fg | 0.3 | fg | 0.8 | fg |
| 32 | 22 | TR | fg | 1 | p | 1 | p | 2 | p |
| 33 | 22 | TR | p | TR | p | TR | p | TR | p |
| 34 | 22 | TR | p | TR | p | Tr | p | Tr | p |
| 35 | 22 | 4.2 | p | 5.6 | f | 5.6 | fg | 5.6 | fg |
| 36 | 22 | 5 | pf | 5.6 | f | 5.6 | fg | 5.6 | fg |
| 37 | 22 | 5 | pf | 5.6 | f | 5.6 | fg | 5.6 | fg |
| 38 | 22 | 3.5 | pf | 5.6 | fg | 5.6 | fg | 5.6 | fg |

Example 4

The fourth set of samples had 7 samples, and Sample 41 was the blank sample having no demulsifier. Sample 42 included 15 ppm of a demulsifier having an oxylalkylated alkylphenol resin crosslinked by a carbon bridge diphenol; Sample 43 included 15 ppm of a demulsifier having an oxylalkylated alkylphenol resin crosslinked by a carbon bridge diphenol; Sample 44 included 15 ppm of a demulsifier having an oxylalkylated alkylphenol resin crosslinked by a carbon bridge diphenol; Sample 45 included 15 ppm of a demulsifier having an oxylalkylated alkylphenol resin crosslinked by a carbon bridge diphenol demulsifier; Sample 46 included 15 ppm of an oxyalkylated alkylphenol resin crosslinked by sulfur bridge diphenol demulsifier in combination with a base-catalyzed oxyalkylated alkylphenol resin to form the demulsifier; Sample 47 included 15 ppm of an oxyalkylated alkylphenol resin crosslinked by sulfur bridge diphenol demulsifier in combination with a base-catalyzed oxyalkylated alkylphenol resin to form the demulsifier. The amount of foulants settled and the water/IF was recorded at 5 minutes, 10 minutes, and 15 minutes.

As noted in TABLE 4, at 5 minutes, the demulsifier within sample 47 separated the most foulants from the sample at 2.5 ppm. At 15 minutes, each demulsifier within each sample from Samples 44, 46-47 separated the most foulants from the sample at 5 ppm.

TABLE 4

SETTLING DATA

| No. | PPM | 5 Min. | Water/IF | 10 Min. | Water/IF | 15 Min. | Water/IF |
|---|---|---|---|---|---|---|---|
| 41 | 0 | 1 | p | 2.9 | pf | 3 | f |
| 42 | 15 | 2.2 | g | 4.5 | fg | 4.7 | fg |
| 43 | 15 | 2.2 | g | 4.5 | fg | 4.9 | g |
| 44 | 15 | 2.2 | g | 4.7 | g | 5 | g |
| 45 | 15 | 2.2 | g | 4 | g | 4.5 | g |
| 46 | 15 | 2.2 | g | 5 | g | 5 | g |
| 47 | 15 | 2.5 | g | 4.8 | g | 5 | g |

In the foregoing specification, the invention has been described with reference to specific embodiments thereof, and has been described as effective in providing methods and compositions for separating at least a portion of foulants from a water-in-oil emulsion. However, it will be evident that various modifications and changes can be made thereto without departing from the broader spirit or scope of the invention as set forth in the appended claims. Accordingly, the specification is to be regarded in an illustrative rather than a restrictive sense. For example, specific demulsifiers, heteroatoms, foulants, heavy crude oils, solvents, second components, and the like falling within the claimed parameters, but not specifically identified or tried in a particular composition or method, are expected to be within the scope of this invention.

The present invention may suitably comprise, consist or consist essentially of the elements disclosed and may be practiced in the absence of an element not disclosed. For instance, the method for separating at least a portion of foulants from a water-in-oil emulsion may consist of or consist essentially of adding an effective of amount of a demulsifier to a water-in-oil emulsion having at least one foulant therein to separate at least a portion of the foulant(s) from the water-in-oil emulsion and separating at least a portion of the foulants from the water-in-oil emulsion; the demulsifier may have or include two phenolic resin chains cross-linked by a carbon or heteroatom, such as but not limited to an oxygen, a nitrogen, a sulfur, a phosphorus, and combinations thereof.

The fluid composition may consist of or consist essentially of a water-in-oil emulsion having at least one foulant; and a demulsifier comprising two phenolic resin chains cross-linked by a carbon or heteroatom selected from the group consisting of a nitrogen, a sulfur, a phosphorus, and combinations thereof; an effective amount of the demulsifier may separate more of the foulant(s) from the water-in-oil emulsion as compared to an otherwise identical water-in-oil emulsion absent the demulsifier.

The words "comprising" and "comprises" as used throughout the claims, are to be interpreted to mean "including but not limited to" and "includes but not limited to", respectively.

What is claimed is:

1. A method of separating at least a portion of foulants from a water-in-oil emulsion comprising:
    adding an effective of amount of a demulsifier to a water-in-oil emulsion having at least one foulant therein to separate at least a portion of the at least one foulant from the water-in-oil emulsion; and
    separating at least a portion of the foulants from the water-in-oil emulsion; wherein the demulsifier is represented by the following structure:

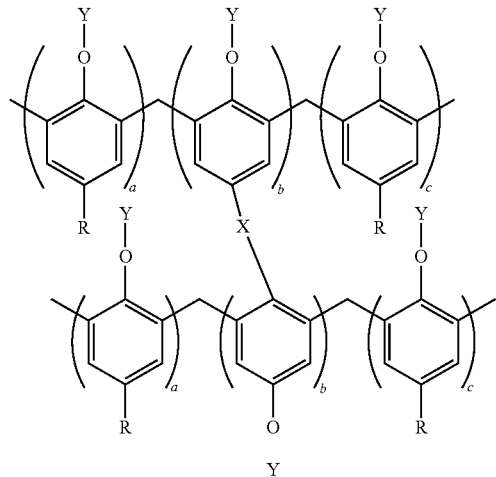

where:
Y are independently a polyethylene oxide moiety, a polypropylene oxide moiety, a polybutylene oxide moiety, a moiety that is mixed block or random ethylene oxide (EO) moiety, propylene oxide (PO), and/or butylene oxide (BO) moiety, where one or both of the two phenolic polymer resin chains have an oxide moiety;
X is a heteroatom selected from the group consisting of oxygen, sulfur, and combinations thereof;
R is a C4-C30 alkyl chain;
$a+b+c>1$; and
$EOs+POs+BOs>1$.

2. The method of claim 1, further comprising separating a water-based phase from the water-in-oil emulsion.

3. The method of claim 1, wherein the at least one foulant is selected from the group consisting of asphaltenes, inorganic solids, coke precursors, and combinations thereof.

4. The method of claim 1, wherein the water-in-oil emulsion comprises a heavy crude oil.

5. The method of claim 1, wherein the effective amount of the demulsifier in the water-in-oil emulsion ranges from about 0.1 ppm to about 50,000 ppm.

6. The method of claim 1, wherein the demulsifier is part of an additive, and wherein the additive further comprises a solvent selected from the group consisting of a hydrocarbon-based solvent, an alcohol-based solvent, an organic carbonate-based solvent, a glycol, a polyglycol, a ketone, an ester, an acetate, and mixtures thereof.

7. The method of claim 6, wherein the additive further comprises a second component selected from the group consisting of a polyol, a diepoxide, and combinations thereof.

8. The method of claim 7, wherein the additive comprises:
    the demulsifier in an amount ranging from about 10 wt % to about 90 wt %;
    the solvent in an amount ranging from about 10 wt % to about 90 wt %; and
    the second component in an amount ranging from about 1 wt % to about 60 wt %.

9. A method comprising:
    separating at least a portion of foulants from a water-in-oil emulsion by adding an effective amount of a demulsifier to a water-in-oil emulsion having at least one foulant therein; wherein the effective amount of the demulsifier separates more of the at least one foulant from the water-in-oil emulsion as compared to an otherwise identical water-in-oil emulsion absent the demulsifier; and wherein the demulsifier is represented by the following structure:

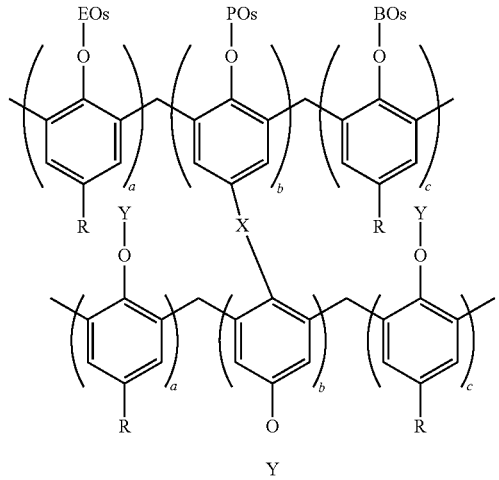

where:
Y are independently a polyethylene oxide moiety, a polypropylene oxide moiety, a polybutylene oxide moiety, a moiety that is mixed block or random ethylene oxide (EO) moiety, propylene oxide (PO), and/or butylene oxide (BO) moiety, where one or both of the two phenolic polymer resin chains have an oxide moiety;
X is a heteroatom selected from the group consisting of oxygen, sulfur, and combinations thereof;
R is a C4-C30 alkyl chain;
a+b+c>1; and
EOs+POs+BOs>1.

10. A fluid composition comprising:
a water-in-oil emulsion having at least one foulant;
a demulsifier; and
wherein an effective amount of the demulsifier separates more of the at least one foulant from the water-in-oil emulsion as compared to an otherwise identical water-in-oil emulsion absent the demulsifier; wherein the demulsifier is represented by the following structure:

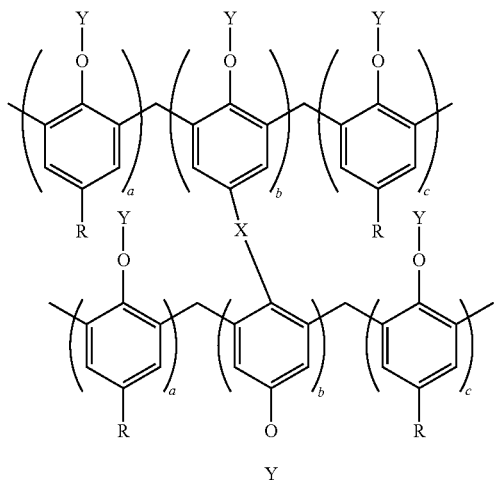

where:
Y are independently a polyethylene oxide moiety, a polypropylene oxide moiety, a polybutylene oxide moiety, a moiety that is mixed block or random ethylene oxide (EO) moiety, propylene oxide (PO), and/or butylene oxide (BO) moiety, where one or both of the two phenolic polymer resin chains have an oxide moiety;
X is a heteroatom selected from the group consisting of oxygen, sulfur, and combinations thereof;
R is a C4-C30 alkyl chain;
a+b+c>1; and
EOs+POs+BOs>1.

11. The fluid composition of claim 10, wherein the at least one foulant is selected from the group consisting of asphaltenes, inorganic solids, coke precursors, and combinations thereof.

12. The fluid composition of claim 10, wherein the water-in-oil emulsion comprises a heavy crude oil.

13. The fluid composition of claim 10, wherein the effective amount of the demulsifier ranges from about 0.1 ppm to about 50,000 ppm.

14. The fluid composition of claim 10, wherein the demulsifier is part of an additive, and wherein the additive further comprises a solvent selected from the group consisting of a hydrocarbon-based solvent, an alcohol-based solvent, an organic carbonate-based solvent, a glycol, a polyglycol, a ketone, an ester, an acetate, and mixtures thereof.

15. The fluid composition of claim 14, wherein the additive further comprises a second component selected from the group consisting of a polyol, a diepoxide, and combinations thereof.

16. The fluid composition of claim 15, wherein the additive comprises:
the demulsifier in an amount ranging from about 10 wt % to about 90 wt %;
the solvent in an amount ranging from about 10 wt % to about 90 wt %; and
the second component in an amount ranging from about 1 wt % to about 60 wt %.

17. A fluid composition comprising:
a water-in-oil emulsion having at least one foulant; and
a demulsifier in an amount ranging from about 0.1 ppm to about 50,000 ppm, wherein the demulsifier is represented by the following structure:

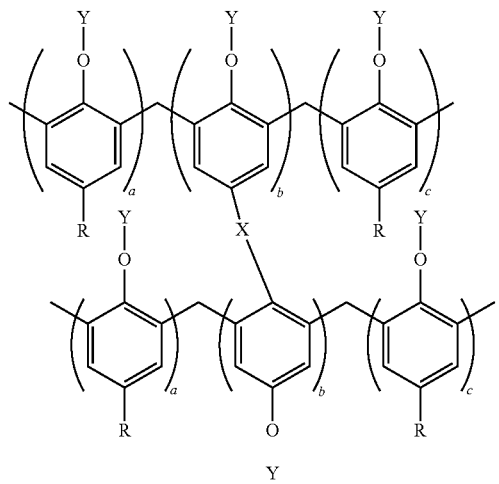

where:
Y are independently a polyethylene oxide moiety, a polypropylene oxide moiety, a polybutylene oxide moiety, a moiety that is mixed block or random ethylene oxide (EO) moiety, propylene oxide (PO), and/or butylene oxide (BO) moiety, where one or both of the two phenolic polymer resin chains have an oxide moiety;
X is a heteroatom selected from the group consisting of oxygen, sulfur, and combinations thereof;
R is a C4-C30 alkyl chain;
a+b+c>1; and
EOs+POs+BOs>1.

18. The fluid composition of claim 17, wherein the water-in-oil emulsion comprises a heavy crude oil.

* * * * *